United States Patent [19]
Randall

[11] Patent Number: 5,558,124
[45] Date of Patent: Sep. 24, 1996

[54] REFRIGERATION MANIFOLD

[75] Inventor: Scott R. Randall, Aurora, Ill.

[73] Assignee: J/B Industries, Inc., Aurora, Ill.

[21] Appl. No.: 453,167

[22] Filed: May 26, 1995

[51] Int. Cl.⁶ ........................................................ G01L 7/00
[52] U.S. Cl. ........................ 137/597; 62/292; 73/756; 137/861
[58] Field of Search ........................... 137/597, 887, 137/883, 861; 62/292; 73/756

[56] References Cited

U.S. PATENT DOCUMENTS

| | | | |
|---|---|---|---|
| 1,265,953 | 5/1918 | Pittman | 137/880 |
| 1,797,591 | 3/1931 | Sartakoff . | |
| 2,212,466 | 8/1940 | Bradford . | |
| 2,238,958 | 4/1941 | Wells . | |
| 2,355,270 | 8/1944 | Campbell . | |
| 2,821,210 | 1/1958 | Liley | 137/599 |
| 2,936,000 | 5/1960 | Mason | 137/557 |
| 2,954,798 | 9/1960 | Mustee | 137/597 |
| 3,050,126 | 8/1962 | Lebeaux et al. | 137/861 |
| 3,118,463 | 1/1964 | Lacart | 137/597 X |
| 3,302,421 | 2/1967 | Karnes | 62/77 |
| 3,438,260 | 4/1969 | Kowal et al. | 73/756 |
| 3,785,163 | 1/1974 | Wagner | 62/77 |
| 4,092,865 | 6/1978 | Strybel | 137/861 |
| 4,109,536 | 8/1978 | Strybel | 73/756 |
| 4,215,721 | 8/1980 | Hetherington et al. | 137/887 X |
| 4,319,492 | 3/1982 | Hewson et al. | 73/756 |
| 4,432,392 | 2/1984 | Paley | 137/883 |
| 4,516,603 | 5/1985 | Mock | 62/292 X |
| 4,881,961 | 11/1989 | Mock | 62/292 |
| 4,890,648 | 1/1990 | Giordano | 137/887 X |
| 5,333,467 | 8/1994 | Pearl, II et al. | 62/77 |
| 5,339,642 | 8/1994 | Laukhuf | 62/77 |

OTHER PUBLICATIONS

TIF Instruments, Inc. (undated) brochure re testing and measuring instruments.
Imperial Eastman (undated) flyer re manifolds.
SPx/Robinair brochure re manifolds (Nov. 1992 date).
Uniweld brochure re refrigeration equipment (1992 copyright date).

*Primary Examiner*—Stephen M. Hepperle
*Attorney, Agent, or Firm*—Tilton, Fallon, Lungmus & Chestnut

[57] ABSTRACT

An improved refrigeration manifold having an unrestricted and uncomplicated flow path as well as a simple and efficient valve system is disclosed. The refrigeration manifold includes a manifold body having a first passage extending horizontally through the body and second and third passages extending vertically through the body to form the high and low sides of the manifold. One or more passages extend through the body from the first passage to the bottom of the manifold body for connection to a vacuum or refrigeration source. First and second ball valves are disposed in the first passage for selectively opening and closing the first passage. Third and fourth ball valves may be provided in fourth and fifth passages which are provided for connection to a vacuum and charging source, respectively. The ball valves are operable by moving a lever through an arc of 90° for quick turn off. The ball valves also each include a ball having an axial bore of a bore diameter equal to a main passage diameter of the passages through the manifold. Preferably, the main passage diameter and the equal bore diameter generally represent a minimum diameter of the system so that the system has a full bore unrestricted flow path. Such an improved flow path results in decreased evacuation and charging times and the improved valve system provides a quick means to turn the valve on or off and does not restrict the flow path.

20 Claims, 2 Drawing Sheets

REFRIGERATION MANIFOLD

BACKGROUND AND SUMMARY

This invention relates to refrigeration manifolds for evacuation, charging and testing of refrigeration systems and, more particularly, to a refrigeration manifold having an improved flow path which decreases evacuation and charging times and has an improved valve system which does not restrict the flow paths and is easy and quick to turn off or on.

Refrigeration manifolds are well known and examples of such devices are shown in U.S. Pat. Nos. 4,092,865, 4,109, 536, and 4,513,603. Typically, such manifolds are used to evacuate refrigerant from refrigeration and air conditioning systems, charge such systems with refrigerant, or test the pressure in the lines of such systems. While use of such refrigeration manifolds is well known, the prior art devices typically have restrictive flow paths that are less than efficient and have valve systems which restrict the flow paths and are difficult to use.

Many of such prior art devices use what are commonly referred to as needle-type valves which have a handle or knob which must be turned through 360° many times in order to move the needle in and out of the flow path. Other prior art devices use diaphragm valves which suffer from the same deficiency in that the valve handle must be turned through 360° many times in order to open or close the valves. More importantly, such prior art devices are characterized by having complicated flow paths which include restriction points and even reversed-direction flow paths at the valves. For example, manifold valves restrict the diameter of the flow paths at the manifold valve even when the valve is fully open. Such restrictions in the flow path or valves can cause pressure changes in the fluid flowing therethrough and may cause a phase change of the fluid which would adversely affect operation of the manifold.

An important aspect of this invention therefore lies in providing an improved refrigeration manifold which has an unrestricted and uncomplicated flow path as well as a simple and efficient valve system. The improved flow path and valve design decrease evacuation and charging times, and the improved valve system provides a quick mechanism for turning the valve off or on. The refrigeration manifold is also efficient to manufacture, and the ball valve design is easy to maintain and service since the ball valves are easy to replace.

Briefly, the refrigeration manifold of this invention comprises a manifold body having first and second opposite ends and a top and a bottom. A first passage extends horizontally through the body along a first horizontal axis from the first end to the second end of the body. Second and third passages extend vertically through the body from the top to the bottom of the body and pass through the low side and high side of the manifold body, respectively. The second and third passages also pass through and are in communication with the first passage. In one embodiment, fourth and fifth passages extend vertically through the body from a central portion of the first passage to the bottom of the body. The second and third passages form the low and high side of the system, and the fourth and fifth passages provide means for connecting the manifold to a vacuum source and a refrigerant source.

First and second ball valve means are disposed in the first passage for selectively opening and closing the first passage between the second and fourth passage and the third and fifth passage, respectively. Third and fourth ball valve means are respectively provided in the fourth and fifth passages. The first and second ends of the first passage are closed by plug means which may take the form of brass plugs. In operation, the first through fourth ball valve means are operable to control the flow of fluids through the manifold for evacuating a refrigeration system, charging a refrigeration system, or testing a refrigeration system in the well known manner.

In one embodiment, the ball valve means each include a ball having an axial bore and mounting means for rotably mounting the balls in the body. The mounting means preferably take the form of teflon seals, and retaining means are provided for locking the mounting means in position.

Each of the ball valve means includes an elongated lever for operating the ball, and each of the levers is moveable through an arc of 90° between a first position in which the axial bore of the ball is coincident with and opens the respective passage and a second[ position in which the axial bore of the ball extends transversely with respect to and closes the respective passage. This allows for quick and easy opening or closing of the valves by a quick ¼ turn which is especially important in an emergency situation. The first and second ball valve means are preferably mounted along a first horizontal axis, and the fourth and fifth ball valve means are preferably disposed along a second lower horizontal axis. The levers extend outwardly from connection points with the balls so that each of the levers can be moved through a full arc of 90° without interfering with movement of any of the other levers regardless of any combination of opening or closing of the valves.

The passages in the manifold body have a main passage diameter which preferably represents a minimum diameter of the passages except for small connection portions which lead to the low and high pressure gauges. The main passage diameter is preferably equal to a bore diameter of the axial bores of the balls of the ball valve means. Such a construction results in a full and open flow path throughout the manifold and there are no restriction points between the ball valves and the passages.

In an alternate construction, the manifold may be provided with only one vertically extending passage for connection to a vacuum or refrigerant source. In such a construction, the manifold includes only a first and second ball valve means which are substantially the same as the first and second ball valve means of the first embodiment.

Other objects, features, and advantages of the present invention will become apparent from the following description and drawings.

BRIEF DESCRIPTION OF THE DRAWINGS

FIG. is a perspective view of the refrigeration manifold embodying this invention.

DETAILED DESCRIPTION OF PREFERRED EMBODIMENTS

Figure 1:
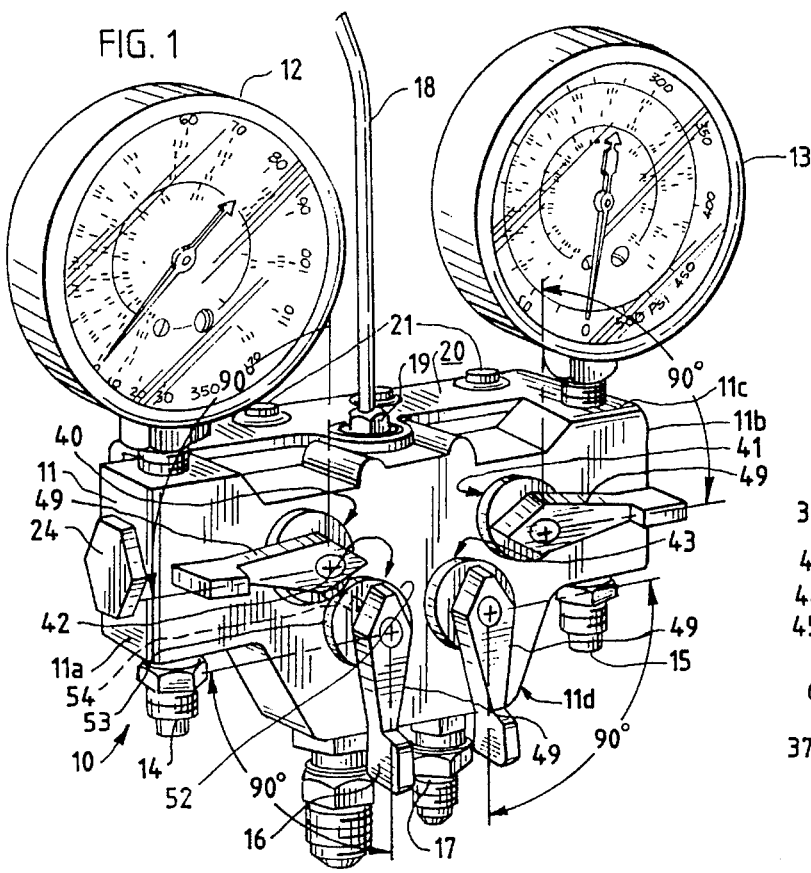

Referring to the drawings, the numeral 10 generally designates a refrigeration manifold which includes a manifold body 11 having first and second opposite ends 11a and 11*b* and a top and a bottom 11*c* and 11*d*. The manifold body 11 is conventionally connected to a low pressure gauge 12, a high pressure gauge 13, a low pressure side connector 14 for connection to the low pressure side of a refrigeration system, and a high side connector 15 for connection to the high side of a refrigeration system. The manifold 10 also includes an evacuation connector 16 for connection to a vacuum source and a charging connector 17 for connection to a source of refrigerant. Low and high pressure gauges 12 and 13 may be entirely conventional, and the use of such gauges in combination with low an high side connectors 14 and 15 and evacuation and charging connectors 16 and 17 is well known. The operation of such a system to evacuate, charge or test a refrigeration system is also well known and need not be repeated here.

The manifold body 11 is conventionally connected to a hanger 18 by a fastener 19. Fastener 19 also secures an elongate plate 20 to the manifold body 11, and the plate 20 includes a plurality of connectors 21 (partially shown). Such connectors 21 include a threaded fastener (not shown) for securing the ends of hoses (not shown) thereto during storage of the system so that contaminants do not enter the hoses. Such a hanger 18 and connectors 21 are entirely conventional and well known in the art.

The inventive aspects of this invention generally lie in providing an improved and unique flow path and valve arrangement in the refrigeration manifold. In particular, manifold body 11 includes a first passage 22 which extends horizontally through body 11 along a first horizontal axis 23 from the first end 11*a* to the second end 11*b* of body 11. First passage 22 includes a central portion 22*a* and end portions 22*b* and 22*c* which are generally symmetrical. The end portions 22*b* and 22*c* of first passage 22 are provided with plug means disposed on the first and second ends 11*a* and 11*b* of body 11 for sealing the opposite ends of the first passage 22. The plug means may take the form of first and second plug members 24 and 25 which are threadably received in body 11. O-rings 26 and 27 may be used to form a tight seal between plugs 24 and 25 and body 11. Plugs 24 and 25 are preferably made of brass but may be made of any other suitable material.

A second passage 28 extends vertically through body 11 from the top 11*c* to the bottom 11*d* of body 11, and second passage 28 extends through and is in communication with first passage 22. The second passage 28 is provided at the low side of the manifold and connects with the low pressure gauge 12 and includes a threaded port 29 for receiving low side connector 14.

A third passage 30 is provided at the high side of body 11 and extends vertically through body 11 from the top 11*c* to the bottom 11*d* of body 11, and third passage 30 extends through and is in communication with first passage 22. Third passage 30 connects with the high pressure gauge 13 and includes a threaded port 31 for connection to high side connector 15.

The manifold body 11 further defines a fourth passage 32 which extends vertically through body 11 from the central portion 22*a* of first passage 22 to the bottom 11*d* of body 11. The fourth passage 32 is in communication with the first passage 22 and includes a threaded port member 33 which is threadably received in passage 32 of body 11. The port member 33 includes a threaded opening 34 for connection to evacuation connector 16, and an O-ring 35 is disposed between port member 33 and body 11 for sealing the connection therebetween.

The manifold body 11 further defines a fifth passage 36 which extends vertically through body 11 from the central portion 22*a* of first passage 22 to the bottom 11*d* of body 11. The fifth passage 36 is in communication with the first passage 22 and includes a threaded port member 37 which is threadably received in passage 36 of body 11. The port member 37 includes a threaded opening 38 for connection to charging connector 17, and an O-ring 39 is disposed between port member 37 and body 11 for sealing the connection therebetween.

A first ball valve means 40 is disposed in the first passage 22 between second passage 28 and fourth passage 32 for selectively opening and closing first passage 22. A second ball valve means 41 is disposed in first passage 22 between third passage 30 and fifth passage 36 for selectively opening and closing first passage 22. A third ball valve means 42 is disposed in fourth passage 32 between passage 22 and the bottom 11*d* of body 11 for selectively opening and closing fourth passage 32. Similarly, a fourth ball valve means 43 is disposed in fifth passage 36 between passage 22 in the bottom 11*d* of body 11 for selectively opening and closing fifth passage 36.

In the embodiment given in the illustrations, each of the first through fourth ball valve means has an identical construction, although different orientation, and the particular embodiment of the ball valve means shown in the drawings will be described using the same reference numerals. In particular, each of the ball valve means 40–43 includes a ball 44 having an axial bore 45. Mounting means 46 are provided for rotatably securing each of the balls 44 in the respective passages.

Figure 3:
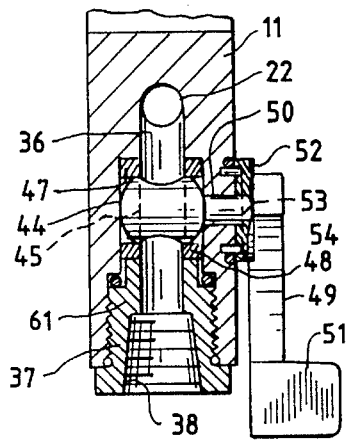
FIG. 3 is a side cross-sectional view taken along line 3—3 of FIG. 2.

Referring to FIG. 3, ball 44 is rotatably mounted in mounting means 46 which takes the form of seals 47 and 48 which may be made of TEFLON. However, other suitable mounting means may be used which adequately support the ball 44 and allows rotatable movement thereof. Lever means are provided for rotating the balls 44 between a first position in which the axial bore 45 is coincident with the respective passage to open it and a second position in which the axial bore 45 extends in a direction transverse to the respective passage to close it. In the embodiment shown in the drawings, the lever means take the form of levers 49 which are each connected to ball 44 by stem 50. Any suitable connection means (not shown), such as a bolt, can be used to attach lever 49 to stem 50. Lever 49 includes an enlarged end portion 51 to facilitate turning of lever 49 through an arc of 90° as shown in FIG. 1. Levers 49 also each include a base 52 having a slotted portion 53, and a pin 54 is mounted on body 11 in each of the slotted portions 53 to limit the movement of levers 49 through a 90° arc.

Referring to FIG. 1, all of the levers 49 are shown in the first position in which the respective axial bores 45 are coincident with and open the respective passages. Each of the levers 49 is moveable through a 90° arc to the second position in which the axial bore 45 of the respective ball is transverse to and closes the respective passage.

In order to minimize the size and weight of the refrigeration manifold 10, the ball valve means 40–43 and respective levers 49 are positioned in the compact and efficient arrangement shown in the drawings. In particular, ball valve means 40 and 41 are mounted along the first horizontal axis 23, and ball valve means 42 and 43 are mounted along a second lower horizontal axis 55 which is positioned between the first horizontal axis 23 and the bottom 11*d* of the manifold body 11. Such positioning of the third and fourth ball valve means 42 and 43 along a horizontal axis 55 below the first horizontal axis 23 prevents the levers 49 from interfering with each other in any possible combination of opening and closing the valves. In that regard, the elongated levers 49 of each of the ball valve means 40–43 has a particular orientation as shown in FIG. 1.

In particular, the lever 49 connected to the first ball valve means 40 extends outwardly toward the first end 11a of body 11 when in the first or open position and extends outwardly toward the top 11c of the body 11 when in the second or closed position.. The lever 49 which is connected to the ball valve means 41 extends outwardly towards the second end 11b of the body 11 when in the first or open position and extends outwardly toward the top 11c of the body 11 when in the second or closed position. The lever 49 which is connected to the third ball valve means 42 extends outwardly toward the bottom 11d of body 11 when in the first or open position and extends outwardly toward the first end 11a of body 11 when in the second or closed position. The lever 49 which is connected to the fourth ball valve means 43 extends outwardly toward the bottom 11d of the body 11 when in the first or open position and extends outwardly toward the second end 11b of the body 11 when in the second or closed position. As shown in FIG. 1, each of the levers 49 is moveable through the entire arc of 90° without interfering with the moveability of any of the other levers regardless of any particular combination of positioning of the respective valves 40–43 in the open or closed position. Hand manipulation of the levers 49 through a ¼ turn (90°) therefore quickly and easily allows the valves to be turned on or off.

Retaining means are operatively associated with each of the mounting means 46 of each of the ball valve means 40–43 for securing the mounting means of each of the respective ball valves means in position. In the embodiment given in the illustrations, the retaining means for the first ball valve means 41 takes the form of a first retaining plug 56 which is positioned between the end plug 24 and the mounting means 46 of the first ball valve 40. The first retaining plug 56 presses the mounting means 46 against an end wall 57 defined by passage 22 of body 11. Similarly, a retaining plug 58 is disposed between end plug 25 and the mounting means 46 for the second ball valve means 41. The retaining plug 58 locks the mounting means 46 against an end wall 59 defined by passage 22 of body 11. Retaining plugs 60 and 61 are further provided in the fourth and fifth passages 32 and 36 for securing the respective mounting means 46 against the respective endwalls 62 and 63 of those passages. Retaining plugs 60 and 61 may form an integral part of respective port members 33 and 37 (as shown) or may be formed from separate components. Preferably, all of the retaining plugs 56, 58, 60 and 61 are composed of brass but other suitable materials may also be used.

Preferably, the manifold body 11 is made of aluminum and 6061-TS aluminum has been found to be particularly suitable for forming the manifold body 11. However, it will be understood that other suitable materials may also be used to form the manifold body 11. In addition to the end plugs 24 and 25 and the retaining plugs 56, 58, 60 and 61, the balls 44 of each of the ball valve means are also preferably composed of brass but other suitable materials may also be used. The seals 47 and 48 which form the mounting means 46 are preferably made of TEFLON but other suitable materials for securing the balls 44 in place may also be used. Levers 49 may be formed of aluminum or other suitable material.

Figure 2:
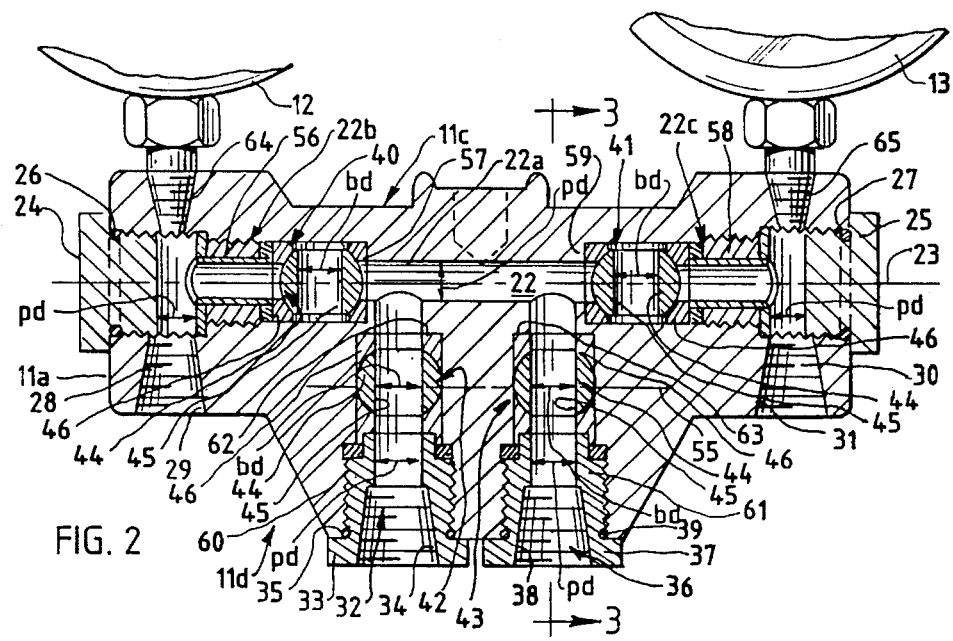
FIG. 2 is a cross-sectional plan view of the refrigeration manifold embodying this invention.

The axial bores 45 of each of the balls 44 of the ball valve means have a bore diameter d. Preferably, each of the bore diameters d of balls 44 is equal. The first through fifth passages 22, 28, 30, 32 and 36 also have a main passage diameter pd. Preferably, as shown in FIG. 2, the main passage diameter pd of each of the passages is preferably uniform and represents a minimum diameter of each of the passages except for the connecting portions 64 and 65 which form part of the second and third passages 28 and 30 and extend between the first passage 22 and the top 11c of body 11 to communicate with the high and low pressure gauges 12 and 13. The connecting portions 64 and 65 which lead to the pressure gauges 12 and 13 need not be of a full diameter since only a small sample of fluid passing through the passages is required to take a measurement with gauges 12 and 13. Accordingly, the connecting portions 64 and 65 do not form part of the main passage diameter of the passages of the system. Except for connecting portions 64 and 65, the main passage diameter of all of the first, second, third, fourth and fifth passages is uniform and has a full bore for providing an unrestricted and efficient flow passage through manifold body 11. Preferably, the main passage diameter pd of the passages and the bore diameter d of the bores 45 of the balls 44 are equal and uniform and may have a diameter of approximately ⅜ inches, ¼ inches or any other suitable diameter. Since the diameter d of the bores 44 of the balls 44 and the main passage diameter pd of all of the passages are equal, the system provides an efficient full bore and unrestrictive flow path for communicating fluids through manifold body 11 and there are no restriction points between the ball valves and the passages.

Figure 4:
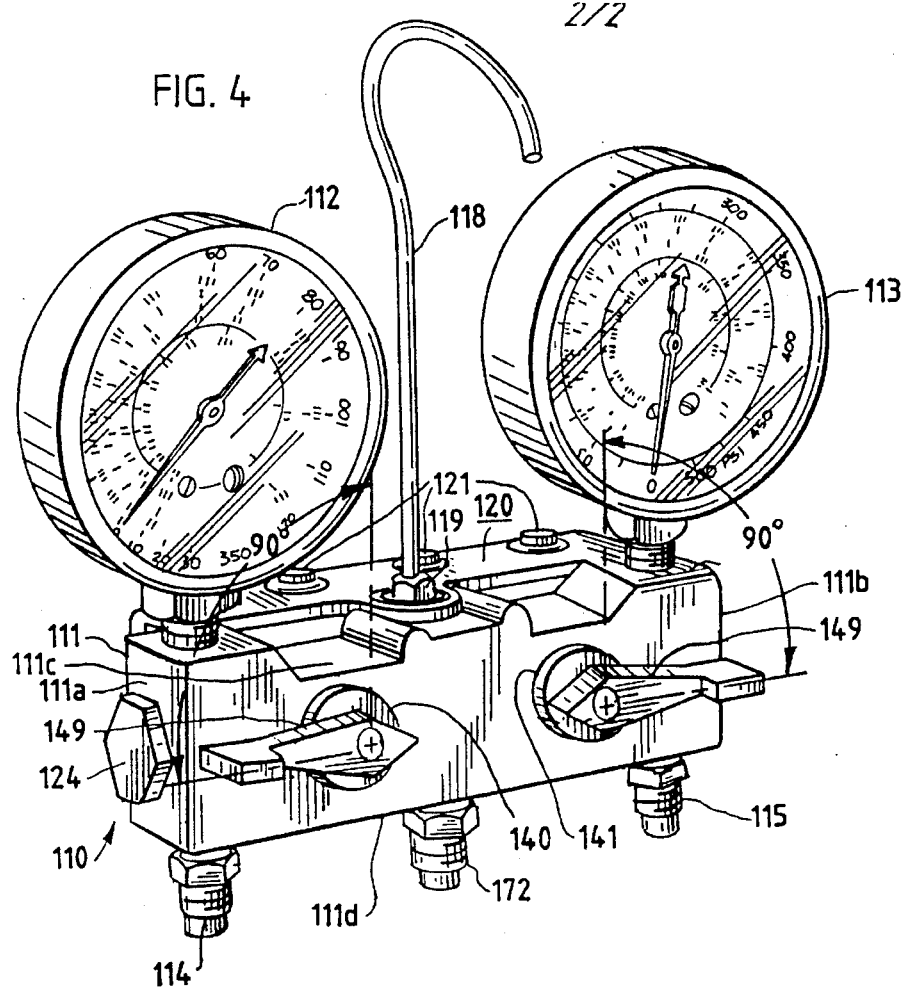
FIG. 4 is a perspective view of an alternate embodiment of a refrigeration manifold embodying this invention.
Figure 5:
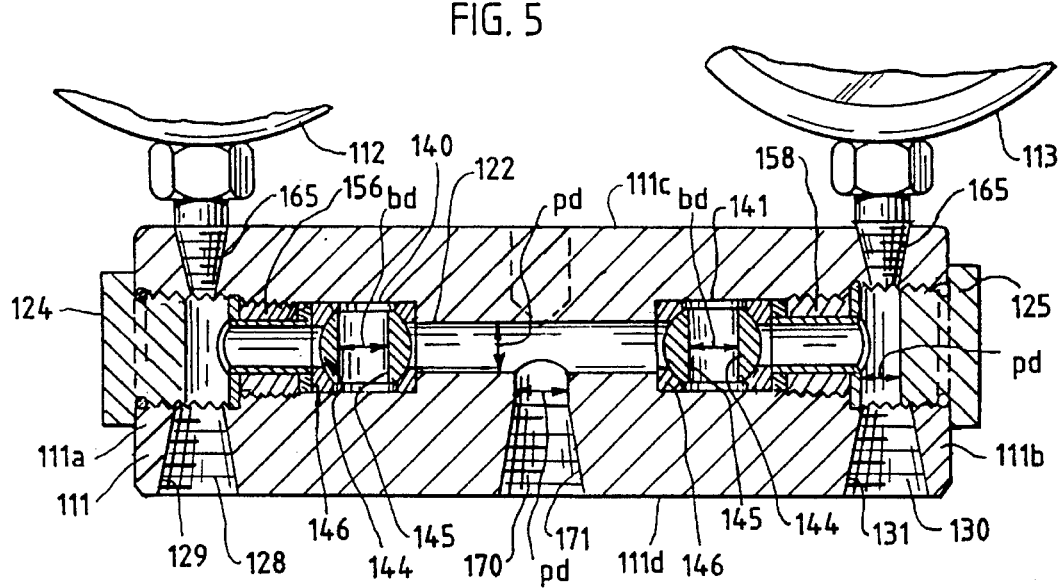
FIG. 5 is a cross-sectional plan view of the embodiment of the refrigeration manifold shown in FIG. 4.

An alternate embodiment of refrigeration manifold of this invention is shown in FIGS. 4 and 5 in which like numerals have been used to designate like parts but have been increased by 100. Briefly, refrigeration manifold 110 includes a manifold body 111 having first and second ends 111a and 111b and a top and bottom 111c and 111d. Manifold 110 further includes a low pressure gauge 112, a high pressure gauge 113, a low side connector 114 and a high side connector 115. The manifold 110 is also provided with a hanger 118, a connector 119, a plate 120 and threaded connectors 121 (partially shown).

Referring to FIG. 5, manifold body 111 defines a first passage 122, a second passage 128 and a third passage 130. The manifold body 11 further defines a fourth passage 170 which extends vertically between first passage 122 and the bottom 111d of manifold body 111. Fourth passage 170 includes a threaded bore 171 for connection to a connector 172 (FIG. 4) for connection to a refrigeration or vacuum source depending upon the desired application of the refrigeration manifold 110.

First ball valve means 140 are disposed between the first passage 128 and passage 170, and second ball valve means 141 are disposed between passage 130 and passage 170. Ball valve means 140 and 141 may take the same construction as ball valve means 40 and 41 as previously described. Briefly, each of the ball valve means include a rotatable ball 144, an axial bore 145 and mounting means 146, and retaining plugs 156 and 158 and end plugs 124 and 125 hold the mounting means 146 of each of the ball valve means in position. As shown in FIG. 4, levers 149 of ball valve means 140 and 141 are moveable through an arc of 90° between a first position for opening passage 122 and a second position for closing passage 122 in the same manner as described in connection with FIG. 1.

The axial bores 145 of balls 144 have a diameter d, and the first, second, third and fourth passageways 122, 128, 130 and 170 have a main passage diameter of pd. Preferably, diameter pd represents a minimum diameter of the passages except for the connecting portions 164 and 165 which communicate with the high and low pressure gauges 112 and 113 as previously described. The diameter d of the axial bores 145 of the balls 144 is preferably the same as the main diameter pd of the passages. As mentioned, that diameter may be approximately ⅜ inches, ¼ inches or any other suitable diameter.

The refrigeration manifold of this invention is advantageous in that it provides an improved flow pattern which is uncomplicated, has a uniform minimum diameter, and does not have restriction points. The unrestricted flow pattern is provided by the main first passage 22 (or 122) which extends horizontally through the body 11 (or 111) from the first to the second end of the body, and end plugs 24 and 25 (or 124 and 125) seal the opposite ends of that passageway. The low side and high side passages 28 and 30 (or 128 and 130) extend vertically through and are in communication with the first main passageway 22 (or 122). Communication between an external source (i.e., a vacuum or refrigerant source) and the main passage 22 (or 122) is then provided by fourth and fifth passages 32 and 36 (or single passage 170). Importantly, ball valve means are provided in the passages for controlling flow, the balls include an axial bore 145 which has the same diameter as the passages in the manifold body 11 (or 111) so that the flow path is not restricted in any way by the valves. In addition, the levers 49 (or 149) of the ball valve means have an advantageous arrangement so that the size and weight of the manifold body remains compact, and the valves may be selectively open or closed quickly by simply moving the respective lever through an arc of 90°. The manifold body 11 (or 111) is also easy to manufacture, and the ball valves are easy to service and maintain since they may be easily replaced.

While in the foregoing, embodiments of the invention have been disclosed in considerable detail for purposes of illustration, it will be understood by those skilled in the art that many of these details may be varied without departing from the spirit and scope of this invention.

I claim:

1. A refrigeration manifold comprising:
   a manifold body having first and second opposite ends and a top and a bottom;
   a first passage extending horizontally through said body along a first horizontal axis from said first end to said second end;
   a second passage extending vertically through said body from said top to said bottom and passing through and being in communication with said first passage;
   a third passage extending vertically through said body from said top to said bottom and passing through and being in communication with said first passage;
   a fourth passage means extending vertically through said body from said first passage to said bottom of said body;
   a fifth passage extending vertically through said body from said first passage to said bottom of said body;
   first ball valve means disposed in said first passage between said second passage and said fourth passage for selectively opening and closing said first passage;
   second ball valve means disposed in said first passage between said third passage and said fifth passage for selectively opening and closing said first passage;
   third ball valve means disposed in said fourth passage for selectively opening and closing said fourth passage;
   fourth ball valve means disposed in said fifth passage for selectively opening and closing said fifth passage;
   plug means disposed on said first and second ends of said body for sealing opposite ends of said first passage.

2. The invention of claim 1 in which each of said first, second, third and fourth ball valve means includes a ball having an axial bore and mounting means for rotatably mounting said ball in the respective passage of said body.

3. The invention of claim 2 in which said mounting means comprise seals which are mounted in the respective passages and rotatably support the respective balls.

4. The invention of claim 3 in which said fourth and fifth passages are respectively provided with first and second port member means for allowing components to be connected to said fourth and fifth passages.

5. The invention of claim 4 in which first and second retaining means are respectively disposed in said fourth and fifth passages between said port member means and said mounting means for securing said mounting means of said ball valve means against an end wall of the respective passages.

6. The invention of claim 5 in which third retaining means are provided between said first ball valve means and said plug means for securing said mounting means of said first ball valve means against a first end wall of said first passage and fourth retaining means are provided between said second ball valve means and said plug means for securing said mounting means of said second ball valve means against a second end wall of said first passage.

7. The invention of claim 2 in which each of said balls of said first, second, third and fourth ball valve means is connected to an elongated lever disposed externally of said body.

8. The invention of claim 7 in which each of said levers is moveable through 90° between a first position in which the axial bore of the respective ball is coincident with and opens the respective passage and a second position in which the axial bore of the respective ball extends transversely with respect to and closes the respective passage.

9. The invention of claim 8 in which said first and second ball valve means are mounted along said first horizontal axis and said third and fourth ball valve means are disposed along a second horizontal axis positioned between said first horizontal axis and said bottom of said body.

10. The invention of claim 9 in which the lever connected to the first ball valve means extends outwardly toward the first end of the body when in the first position and extends outwardly toward the top of the body when in the second position, the lever connected to the second ball valve means extends outwardly toward the second end of the body when in the first position and extends outwardly toward the top of the body when in the second position, the lever connected to the third ball valve means extends outwardly toward the bottom of the body when in the first position and extends outwardly toward the first end of the body when in the second position, and the lever connected to the fourth ball valve means extends outwardly toward the bottom of the body when in the first position and extends outwardly toward the second end of the body when in the second position.

11. The invention of claim 2 in which each of said axial bores of each of said balls has a bore diameter, each of said bore diameters being equal.

12. The invention of claim 11 in which each of said first, second, third, fourth and fifth passages has a main passage diameter, each of said main passage diameters being equal.

13. The invention of claim 12 in which said bore diameter is equal to said main passage diameter.

14. The invention of claim 13 in which said bore diameter and said main passage diameter are approximately ⅜ inches.

15. The invention of claim 13 in which said bore diameter and said main passage diameter are approximately ¼ inches.

16. The invention of claim 13 in which said main passage diameter is a minimum diameter of said first, second, third, fourth and fifth passages except for first and second connecting portions which form part of said second and third passages and which extend between said first passage and said top of said body.

17. The invention of claim 1 in which said body is made of aluminum.

18. The invention of claim 1 in which said plug means comprises first and second end plugs which are composed of brass.

19. The invention of claim 5 in which said first and second retaining means comprise portions of said first and second port member means and said first and second port member means are composed of brass.

20. The invention of claim 6 in which said third and fourth retaining means comprise brass fittings.

* * * * *